United States Patent
Malet

(10) Patent No.: US 7,040,020 B2
(45) Date of Patent: May 9, 2006

(54) WIRE STRIPPER

(76) Inventor: Ronald Malet, 98 MacArthur Ave., Sayreville, NJ (US) 08872

( * ) Notice: Subject to any disclaimer, the term of this patent is extended or adjusted under 35 U.S.C. 154(b) by 0 days.

(21) Appl. No.: 10/822,914

(22) Filed: Apr. 13, 2004

(65) Prior Publication Data

US 2005/0223561 A1  Oct. 13, 2005

(51) Int. Cl.
*B21F 13/00* (2006.01)
(52) U.S. Cl. .......................... 30/90.8; 30/90.4; 30/90.1
(58) Field of Classification Search ................ 30/90.1, 30/90.4, 90.8, 278, 289; 81/9.4
See application file for complete search history.

(56) References Cited

U.S. PATENT DOCUMENTS

| | | | | |
|---|---|---|---|---|
| 2,662,283 | A | * 12/1953 | Gienger ....................... | 30/90.8 |
| 2,761,211 | A | * 9/1956 | Grant .......................... | 30/90.8 |
| 3,114,277 | A | * 12/1963 | Clendenin .................... | 30/90.1 |
| 3,375,579 | A | * 4/1968 | Slonksnes .................... | 30/90.8 |
| 3,800,418 | A |   4/1974 | Schlueter | |
| 4,117,749 | A |  10/1978 | Economu | |
| 4,463,494 | A | * 8/1984 | Bianco, Jr. ................... | 30/90.4 |
| D301,115 | S |   5/1989 | Chapin et al. | |
| 5,293,791 | A |   3/1994 | Allen et al. | |
| 5,561,903 | A | * 10/1996 | Bourbeau .................... | 30/90.4 |
| 5,577,150 | A | * 11/1996 | Holder et al. ............... | 385/134 |
| 5,829,322 | A |  11/1998 | Chen | |
| 6,012,357 | A |   1/2000 | John | |
| 6,018,873 | A | * 2/2000 | McClellan ................... | 30/90.4 |
| 6,029,297 | A |   2/2000 | French | |
| 6,067,715 | A |   5/2000 | Hollingsworth | |
| 6,081,953 | A |   7/2000 | Chou | |
| 6,161,289 | A | * 12/2000 | Alexander ................... | 30/90.1 |
| 6,185,771 | B1 |   2/2001 | Trusty, Sr. | |
| 6,192,588 | B1 |   2/2001 | Krampe | |

* cited by examiner

*Primary Examiner*—Hwei-Siu Payer
(74) *Attorney, Agent, or Firm*—Daniel Kirshner

(57) ABSTRACT

A wire stripper that can be utilized to rapidly strip insulation from a number of wires simultaneously and can be used simultaneously on a variety of different gauge wires. A stripping block has a plurality of wire apertures of varying diameters. Cooperating and continuous with the apertures are a plurality of blade receiving slots. A blade is positioned into at least one of the slots so that its cutting edge enters into an aperture. A compress bar is tightened down onto the blade to exert compress pressure. Wire is inserted into the wire aperture with the appropriate diameter for the selected gauge of wire. The compress bar is tightened using wing nuts so that enough pressure is exerted onto the blade to slit the insulation of the wire.

2 Claims, 4 Drawing Sheets

WIRE STRIPPER

FIELD OF THE INVENTION

The present invention relates generally to a wire stripper and more specifically to a novel wire stripper that includes a stripping block having a plurality of wire apertures for quickly simultaneously stripping insulation off of multiple wires and of varying gauges.

BACKGROUND OF THE INVENTION

The present invention relates to a device for stripping insulation from electrical wire. Typically, electrical wire has a copper or other metal strand as a core for conducting electricity and is wrapped with a layer of plastic insulation. Furthermore, electrical wire is available in a wide variety of diameters which in the industry are referred to a 'gauges'. When electricians utilize electrical wire, there is a need to remove a portion of the plastic insulation to reveal the conducting core contained therein and this process is referred to a stripping the wire. Electricians frequently strip large quantities of wire at one time. Furthermore it is often necessary to strip a long length of insulation from a wire for a grounding strip from each individual strand. Moreover, electricians often must strip wires of various gauges. Finally, in order to recycle wire after use, the insulation is removed from long lengths of the wire in order to prepare it for recycling.

Typical prior art wire strippers typically strip the insulation around its circumference. In other words, the insulation is stripped in a circular manner. Well-known prior art wire strippers in the nature of scissor-like or pliers-like devices have been known in the art for many years.

It would be advantageous to provide a wire stripper that can quickly strip large quantities of wire. It would be advantageous to provide a wire stripper that can strip many strands of wire simultaneously. It would be advantageous to provide a wire stripper that can strip a long length of wire from a strand of wire in one action. And it would be advantageous to provide a wire stripper that can accommodate a variety of gauges of wire either individually or simultaneously. Such are the objective of the present invention wire stripper.

SUMMARY OF THE INVENTION

The present invention is a wire stripper that can be utilized to rapidly strip insulation from a number of wires simultaneously. Moreover, the wire stripper of the present invention can be used simultaneously on a variety of different gauge wires. A stripping block has a plurality of wire apertures of varying diameters. Cooperating and continuous with the apertures are a plurality of blade receiving slots. A blade is positioned into at least one of the slots so that its cutting edge enters into an aperture. A compress bar is tightened down onto the blade to exert tensioning pressure. Wire is inserted into the wire aperture with the appropriate diameter for the selected gauge of wire. The compress bar is tightened using wing nuts so that enough pressure is exerted onto the blade to slit the insulation of the wire without damaging the conductive strand. In this manner, the insulation of the wire is slit in the direction of the longitudinal axis of the wire. Therefore, large amounts of insulation can be stripped off the wire. Moreover, by utilizing a plurality of blades, multiple wire and wires of various gauges can be stripped simultaneously.

DETAILED DESCRIPTION OF THE INVENTION

The present invention is a wire stripper. The present invention wire stripper is utilized to strip insulation off of electrical wire quickly and can be used on a variety of gauges of wire. Furthermore, the wire stripper of the present invention can be used to strip insulation off of multiple strands of wire simultaneously and can do so even if the strands of wire are of differing gauges.

Referring to the figures, the wire stripper includes a stripping block 10. The stripping block is formed from wood, plastic or other such rigid material. As shown, the stripping block is an elongated three-dimensional rectangular block. Drilled off center through the stripping block are a plurality of wire apertures 12 that penetrate the stripping block from its front face clear through to its back face. In the preferred embodiment shown, the wire apertures may be formed of varying diameters, thereby facilitating stripping insulation off of various gauge wires.

Figure 1:
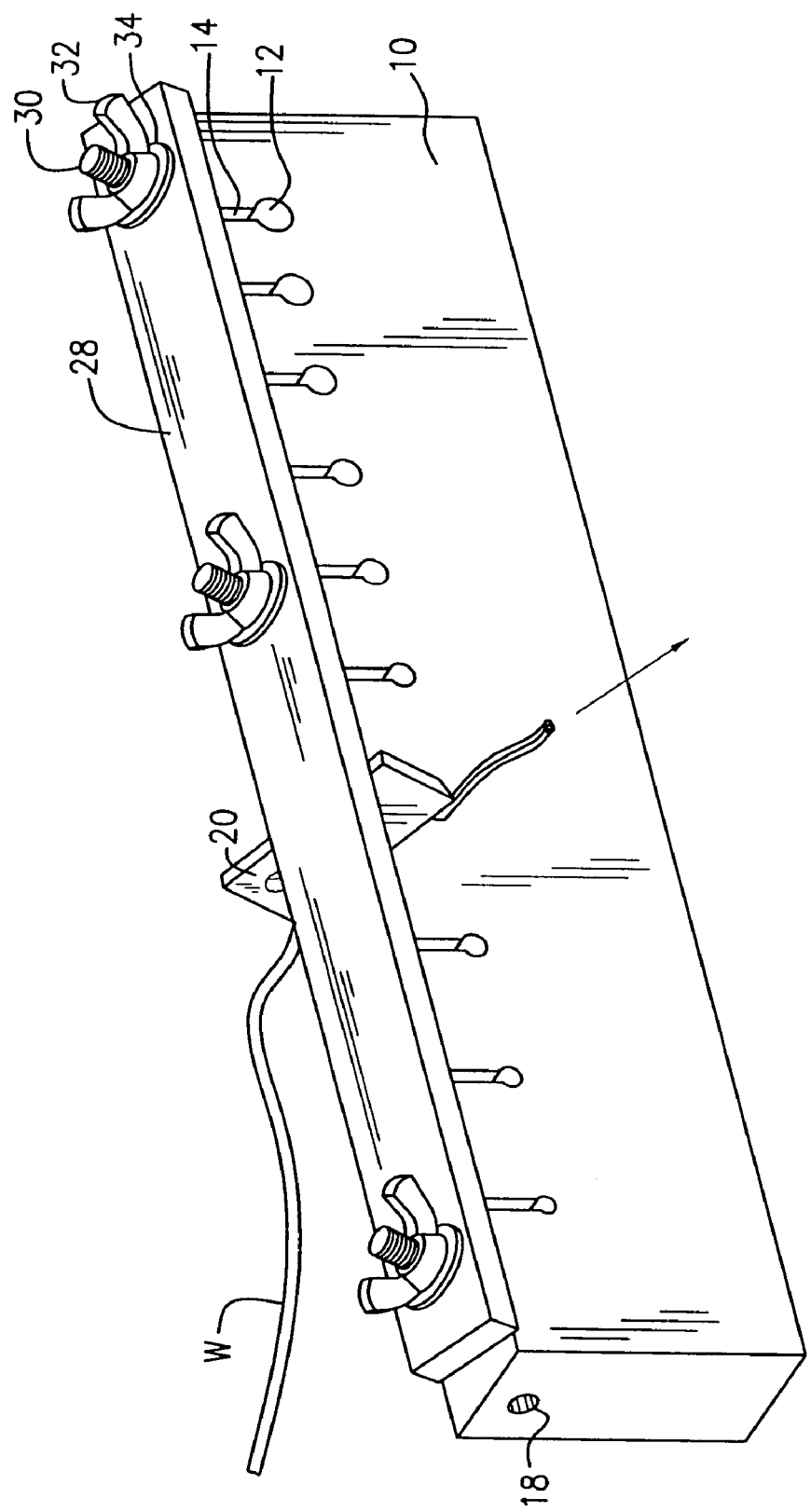
FIG. 1 is a front perspective view of the present invention wire stripper.
Figure 2:
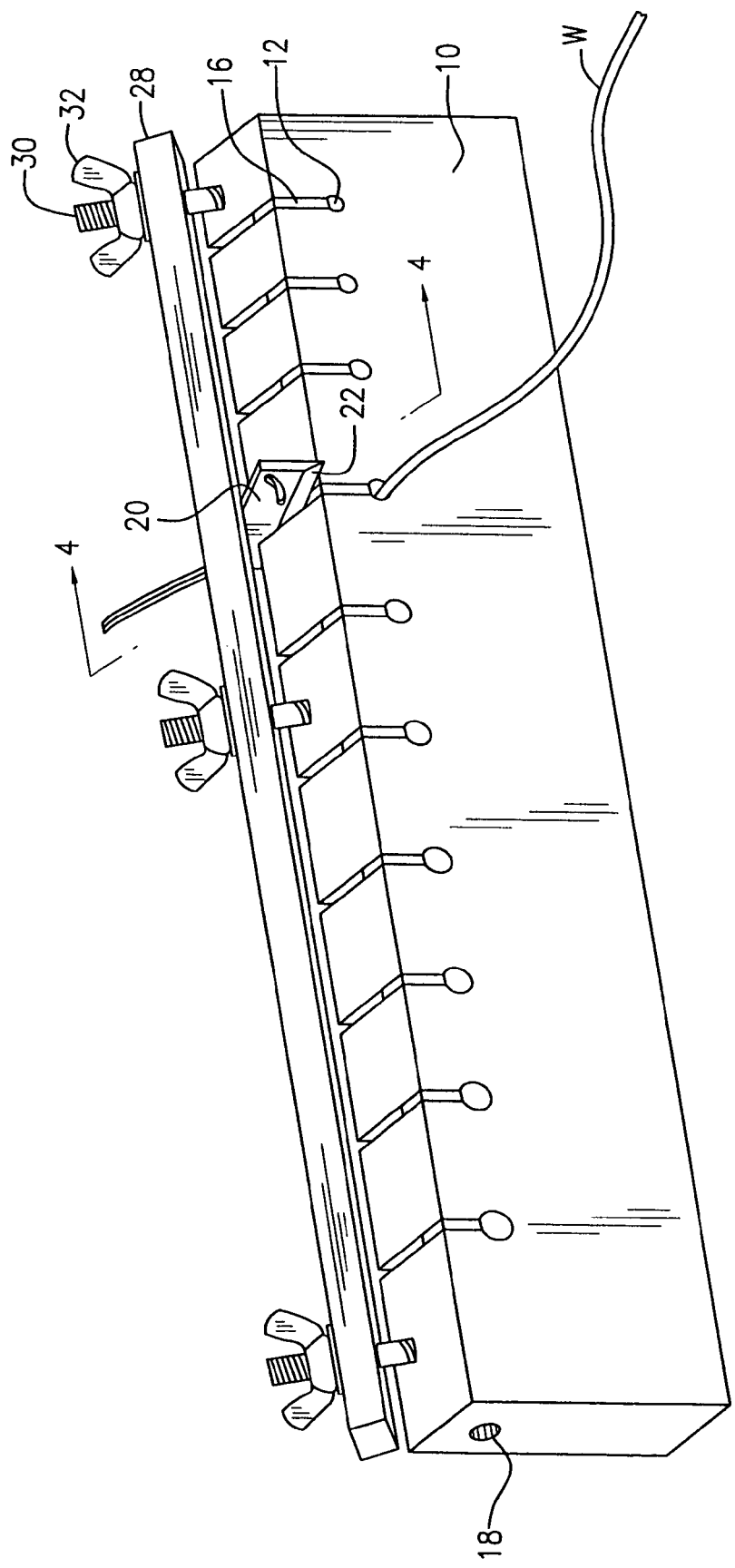
FIG. 2 is a back perspective view of the present invention wire stripper.

Slots 14 for receiving blades are cut into the top face of the stripping block. The slots are cut into the block to cooperate with the wire apertures. Specifically, the slots are positioned so that they penetrate down through the top and front faces of the block until each slot reaches its appropriate wire aperture and cooperates therewith. More specifically and as best seen in FIG. 1, each slot is positioned slightly offset from its wire aperture. In other words, the wire apertures are positioned half off-center of the slot and on alternating sides of every other wire aperture. Moreover, each slot is cut so that it does not penetrate the back face of the block (see FIG. 2). In other words, the slots are cut into the block so that ridges 16 remains at the top and in the back so that the blade will rest angularly on said ridge. It is understood that the preferred embodiment shown includes a plurality of slots. However, the present invention is fully operational if only one blade receiving slot is presented.

A bore 18 penetrates from one side face to the other side face of the stripping block. The bore is positioned in the block at a height where it will intersect the slots for the purpose of receiving a blade securing rod.

Figure 3:
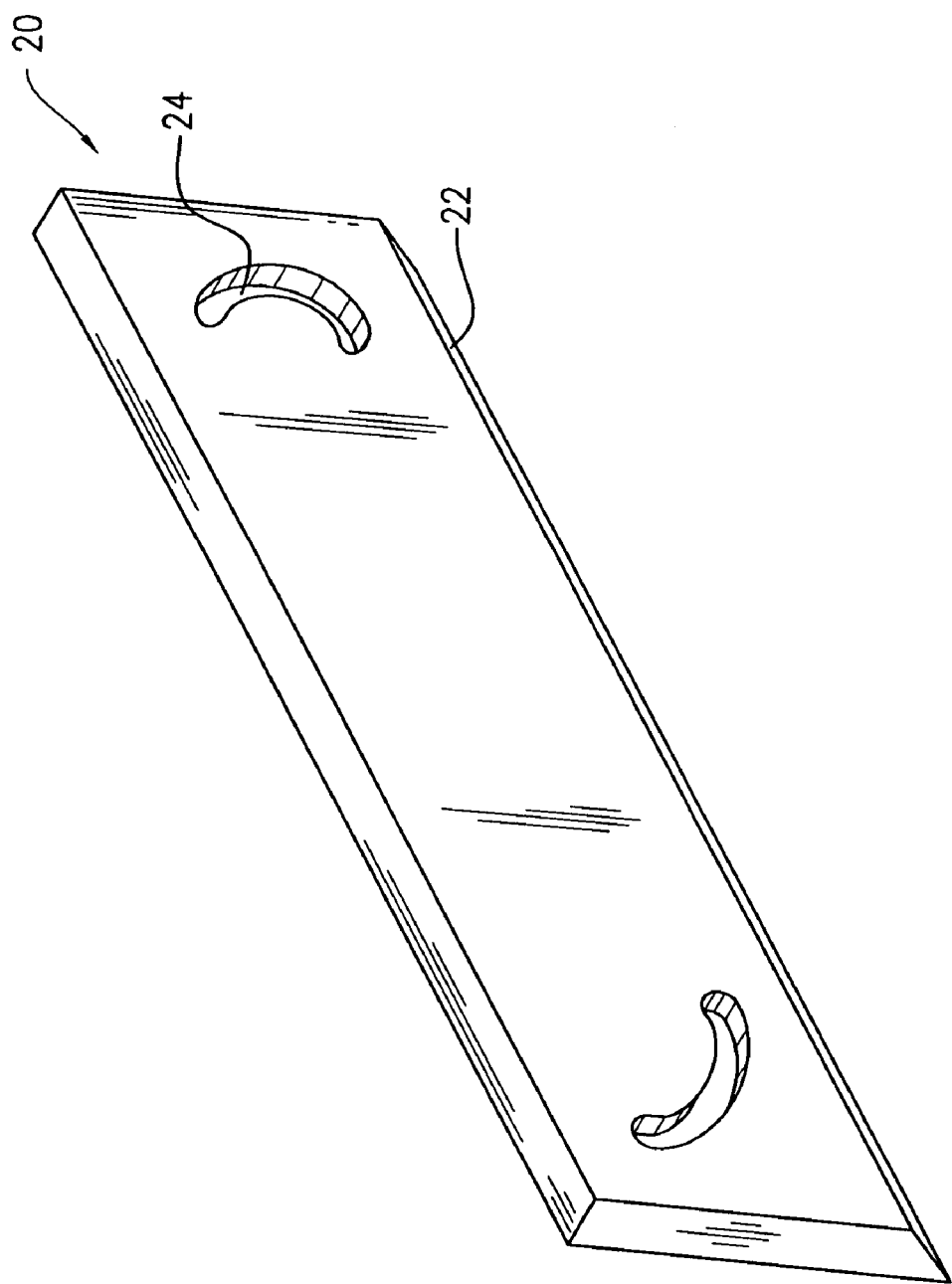
FIG. 3 is a front perspective view of the blade of the present invention wire stripper.

A sharp wire stripping blade 20 is provided which blade is best viewed in FIG. 3 and which has one very sharp cutting surface 22. In addition, the blade includes two holes 24 (one on each end of the blade) which are positioned so that they will interact with the rod receiving bore 18 on the stripping block. The holes are best presented in the form of a tear-drop shape as shown or in the shape of a half moon. Two holes are preferable since in this configuration the blade will be reversible. Round holes can be used in the blades depending on what material is used to manufacture the stripping block. However, half-moon or tear-drop shaped holed will allow the blade to move up or down with coordinating pressure from the compress bar 28.

Figure 4:
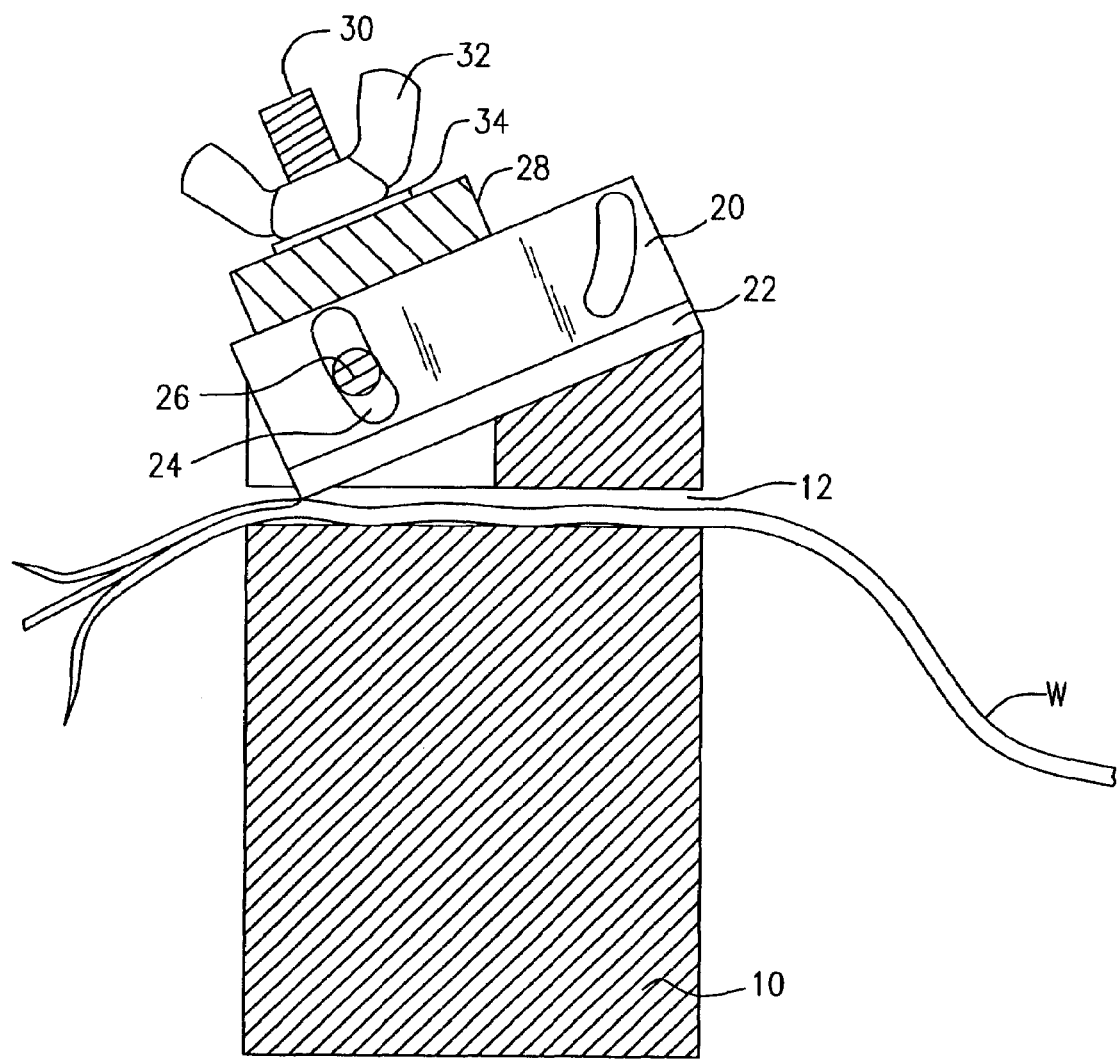
FIG. 4 is a cross-sectional view of the present invention shown along section 4—4 of FIG. 2.

Now, the blade 20 (or if desired, a plurality of blades) is placed into the slots as shown. The sharp edge of each blade is inserted downwards so that the blade rests in the slot 14 and the cutting edge of the blade projects into the wire-receiving aperture 12. The blade is inserted angularly so that it rests on the ridge 16 in the back of the block and the front tip of the cutting blade projects into the aperture. Then, a blade-securing rod 26 (which is best viewed in the cross-sectional view of FIG. 4) is inserted into the bore 18 so that it goes through the tear-dropped shaped hole 24 on the blade (or blades) thereby retaining the blades in their positions.

A compress bar 28 is provided which preferably has as length that is substantially similar to the length of the block. The compress bar has holes along its length for insertion of the bolts 30 which are used to attach the compress bar to the block. The bolts are attached securely to the top face of the block and extend forward at an angle. Once the blade or blades 22 are held in place by the rod 26, the bolts are passed though the compress bar and the appropriate compression may be applied to the blade by selectively tightening or loosening the wing nuts 32. Washers 34 are utilized to space the wing nuts from the stripping block.

The wire stripper of the present invention is utilized in the following manner. With the compress bar removed or loosened, the strands of wire are inserted through the wire apertures 12. As disclosed, the wire stripper can be used to strip one strand of wire or more than one strand simultaneously. Moreover, by appropriately selecting the diameter of the wire aperture, multiple gauges of wire can be easily accommodated. Next, the blade or blades are inserted as disclosed, and the rod is inserted through the bore in the block and through the tear-drop holes in the blades. Next, the compress bar is attached by inserting the bolt on the block through the holes on tensioning bar. Appropriate compression is applied to the blade by tightening the wing nuts as much as necessary to strip the wire. Finally, the wire (shown as W on the drawings) is pulled through the wire apertures thereby slitting the insulation. Specifically, the user pulls the wire from the front of the wire stripper and the blade makes a longitudinal slit in the insulation (the blade makes a cut into the insulation with is parallel to the longitudinal axis of the wire.) It should be obvious that the pressure on the blade should be high enough to cut through the insulation, yet not so high as to damage the wire.

As is evident, the present invention wire stripper can be used to quickly strip insulation off of wire. Furthermore, many strands of wire can be stripped simultaneously. Finally, since the wire is stripped longitudinally, a long portion of insulation can be stripped off of each individual wire in one swift action.

The foregoing is considered as illustrative only of the principles and preferred embodiment of the invention. Furthermore, since numerous changes and modifications will readily occur to one skilled in the art, it is not desired to limit the invention to the exact construction, operation and embodiment shown and described, and accordingly all suitable modifications and equivalents may be resorted to, falling within the scope of the invention.

What is claimed is:

1. A wire stripper comprising:
   a stripping block including a front face, a back face, a top face, a first side face, and a second side face, said stripping block having a plurality of wire apertures of varying diameters that penetrate said stripping block from said front face to said back face, said stripping block further including a plurality of blade receiving slots cut into its top face which interact with said wire apertures and whereby each blade receiving slot is positioned off center relative to the corresponding wire aperture, said stripping block further including a bore that extends from said first side face to said second side face; and
   a plurality of blades inserted into said blade receiving slots whereby the cutting edge of each of said blades enters into a respective one of said wire apertures;
   a compress bar for exerting compression on said blades; and
   a blade securing rod inserted through bore for retaining each said blade for urging the cutting edge of said blade toward the wire aperture in position;
   whereby at least one wire is inserted through said at least one wire aperture and insulation thereby stripped longitudinally.

2. A wire stripper comprising:
   a stripping block including a front face, a back face and a top face, said stripping block having a plurality of wire apertures of varying diameters that penetrate said stripping block from said front face to said back face, and said stripping block further including a plurality of blade receiving slots cut into its top face which interact with said wire apertures; and
   a plurality of blades inserted into said blade receiving slots whereby the cutting edge of each of said blades enters into a respective one of said wire apertures; and
   a compress bar for exerting compression on each said blade for urging the cutting edge of said blade toward the wire aperture;
   whereby at least one wire is inserted through at least one of said plurality of wire apertures and insulation thereby stripped longitudinally.

\* \* \* \* \*